United States Patent Office 3,466,325
Patented Sept. 9, 1969

3,466,325
1-(ORTHO-ALKENYL PHENOXY) - 2-HYDROXY-3-ISOPROPYLAMINOPROPANES AND THE SALTS THEREOF
Arne Elof Brandstrom, Goteborg, Hans Rudolf Corrodi, Molndal, and Bengt Arne Hjalmar Ablad, Goteborg, Sweden, assignors to Aktiebolaget Hässle, Goteborg, Sweden, a company of Sweden
No Drawing. Filed Jan. 18, 1966, Ser. No. 521,436
Claims priority, application Sweden, Apr. 30, 1965, 5,711/65
Int. Cl. C07c 93/06; A61k 27/00
U.S. Cl. 260—501.17                    4 Claims

ABSTRACT OF THE DISCLOSURE

Ortho-alkenylphenoxy-hydroxyalkyl derivatives of isopropylamine, specifically, allyl, 2-chloroallyl, 3-chloroallyl, and propenyl substituted phenoxy-hydroxyalkyl isopropylamine derivatives, their preparation, pharmaceutical compositions containing these compounds, and the use thereof in the treatment of cardiac and vascular diseases.

---

The present invention relates to isopropanolamine derivatives and more particularly to alkenylphenoxy-hydroxyalkyl derivatives of isopropylamines and to methods for the preparation of such compounds. The invention also concerns the preparation of pharmaceutical formulations containing such alkenylphenoxy-hydroxyalkyl isopropylamines and to methods for the pharmacological employment of such compounds.

The principal object of this invention is to provide new alkenylphenoxy-hydroxyalkyl isopropylamine compounds having valuable pharmacological properties.

It is a still further object of the invention to provide new compounds which can be formulated into pharmacological preparations in dosage units.

Another object of the invention is to provide compounds which may be employed in the treatment of cardiac and vascular diseases.

Still another object of this invention is to provide novel compounds which have valuable diuretic properties.

It is a still further object of the invention to provide medicinal compounds which can be used to protect a patient's heart against excessive sympathetic stimulation.

It is a still further object of the invention to provide new medicinal compounds which can be used in the treatment of cardiac and vascular diseases to protect the patient's heart against increased blood levels of epinephrine and norepinephrine.

It is a further object of the invention to provide novel compounds for the treatment of cardiovascular diseases which have local anesthetic effects.

Another object of the invention is to provide simple methods for the preparation of alkenylphenoxy-hydroxyalkyl isopropylamines.

These and other related objects are achieved by providing new alkenylphenoxy-hydroxy-alkyl isopropylamine derivatives characterized by the general formula:

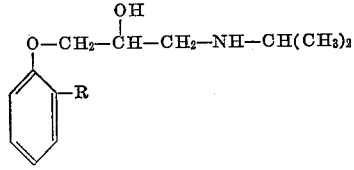

wherein R can be an allyl, propenyl, 2-chloroallyl or 3-chloroallyl radical.

The 1-alkenylphenoxy-2-hydroxy - 3 isopropylaminopropane described above may be conveniently prepared by a process which comprises reacting a 1-alkenylphenoxy-2,3-epoxypropane, which may be represented by the formula

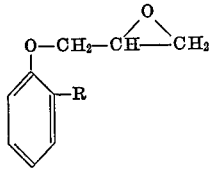

in which R is the same as described above, with a compound containing an active hydrogen atom and either an isopropylamino group or an atom or group of atoms which is capable of being converted into an isopropylamino group. These reactants may be characterized by the formula: H—X, wherein X may be a halogen atom or an amino group such as isopropylamine. When X is a halogen atom or an unsubstituted amino group, the resulting product can then be isopropylated by techniques which are well known, for example, by carrying out a reductive isopropylation in the presence of acetone and a reducing agent such as sodiumborohydride, potassium borohydride, lithium aluminum hydride, and the like.

Since the new compounds described above contain an asymmetric carbon atom, they exist in optically active forms which can be resolved into their optical antipode by well-known techniques employing optically active acids such as tartaric acid, camphor-10-sulfonic acid and dibenzoyl-tartaric acid, and the like.

The alkenylphenyl-2,3-epoxypropyl ethers which are described above may be prepared by reacting a suitable alkenylphenol with an epihalohydrin such as epichlorohydrin. Suitable alkenylphenyl-2,3-epoxypropyl ethers include o-allylepoxypropoxybenzene, o-propenylepoxypropoxybenzene, o-(2 - chloroallyl)-epoxypropoxybenzene, o-(cis-3-chloroallyl)-epoxypropoxybenzene and p-allyl-epoxypropoxybenzene.

The alkenylphenoxy-isopropanolamines disclosed herein have been shown to possess valuable pharmacological properties. At relatively low dosage levels they have been found to block the effect of intravenously administered cardiac stimulants, such as isoprenaline, and the effects of sympathetic stimulation of the heart and the fat tissue.

The acute and chronic toxicity of these compounds is very low and experiments in man show that they are well absorbed from the gastrointestinal tract and that their effect is of long duration. The compounds may, therefore, be clinically used in particular for the treatment of cardiac and vascular diseases under conditions such that the heart has to be protected against excessive sympathetic stimulation, e.g., during mental stress or muscular work, circumstances which are known to increase the level of the sympathomimetic amines epinephrine and norepinephrine in the blood.

In clinical practice the compounds of the invention will normally be administered orally, rectally or by injection, in the form of pharmaceutical preparations comprising the active ingredient either as a free base or as a pharmaceutically acceptable nontoxic, acid addition salt, e.g., the hydrochloride, lactate, acetate, sulfamate, and the like, in association with a pharmaceutically acceptable carrier. Accordingly, terms relating to the novel compounds of this invention whether generically or specifically are intended to include both the free amine base and the acid addition salts of the free base, unless the context in which such terms are used, e.g., in the specific examples, would be inconsistent with the broad concept. The carrier may be a solid, semisolid or liquid diluent or an ingestible capsule. These pharmaceutical preparations constitute a further aspect of this invention. Usually the active substance will constitute between 0.1 and 95% by weight of the preparation, more specifically between 0.5 and 20% by weight for preparations intended for injection and between 2 and 50% by weight for preparations suitable for oral administration.

To product pharmaceutical preparations containing a compound of the invention in the form of dosage units for oral application, the selected compound may be mixed with a solid pulverulent carrier, e.g., lactose, saccharose, sorbitol, mannitol, starches such as potato starch, corn starch, amylopectin, laminaria powder or citrus pulp powder, cellulose derivatives, or gelatin, and a lubricant such as magnesium stearate, calcium stearate, polyethylene glycol waxes, and the like, and then compressed to form tablets. If coated tablets are required, the cores, prepared as described above, may be coated with a concentrated sugar solution which may contain, e.g., gum arabic, gelatin, talcum, titanium dioxide, and the like. Alternatively, the tablet can be coated with a lacquer dissolved in a readily volatile organic solvent or mixture of organic solvents. Dyestuffs may be added to these coatings in order to readily distinguish between tablets containing different active substances or different amounts of the active compound.

For the preparation of soft gelatin capsules (pearl-shaped closed capsules) consisting of gelatin and, for example, glycerol or similar closed capsules, the active substance may be admixed with a vegetable oil. Hard gelatin capsules may contain granulates of the active substance in combination with solid, pulverulent carriers such as lactose, saccharose, sorbitol, mannitol, starches (e.g., potato starch, corn starch or amylopectin), cellulose derivatives or gelatin.

Dosage units for rectal application can be prepared in the form of suppositories comprising the active substance in admixture with a neutral fatty base, or gelatin rectal capsules comprising the active substance in admixture with vegetable oil or paraffin oil.

Liquid preparations for oral application may be in the form of syrups or suspensions, for example, solutions containing from about 0.2% to about 20% by weight of the active substance, herein described, the balance being sugar and a mixture of ethanol, water, glycerol, and propyleneglycol. Optionally such liquid preparations may contain coloring agents, flavoring agents, saccharine and carboxymethylcellulose as a thickening agent.

Solutions for parenteral applications by injection can be prepared in an aqueous solution of a water-soluble pharmaceutically acceptable salt of the active substance preferably in a concentration of from about 0.5% to about 10% by weight. These solutions may also contain stabilizing agents and/or buffering agents and may conveniently be provided in various dosage unit ampules.

The following examples illustrate the principles and practices of the instant invention, Examples 1 through 4 being directed to the preparation of o-alkenylphenoxy-2,3-epoxypropanes suitable for use as starting materials for the preparation of the compounds disclosed herein.

Example 1

1-(o-allylphenoxy)-2,3-epoxypropane was prepared by dissolving 727 grams of o-allylphenol and 550 grams of epichlorohydrin in a solution containing 428 grams of potassium hydroxide in 3500 milliliters of water in a 5 liter flask. The solution was stirred overnight and the resulting product was then extracted with ether, dried over potassium carbonate and evaporated. The residue, a yellow oil, was distilled under vacuum at a temperature of from about 106° C. to 109° C. at a pressure of from 0.6 to 0.8 milliliter of mercury to yield 698.5 grams of product.

Example 2

1-(o-propenylphenoxy)-2,3-epoxypropane was prepared by adding 22 grams of o-propenylphenol and 16.7 grams of epichlorohydrin to a solution of 13 grams of potassium hydroxide in 125 milliliters of water. The resulting solution was stirred overnight and the product was extracted with ether, dried over magnesium sulfate and evaporated. The residue was distilled under vacuum at a temperature of 94° C. to 100° C., at a pressure of 0.4 millimeter of mercury to yield 17.2 grams of product.

Example 3

1-(o-2-chloroallylphenoxy)-2,3-epoxypropane was prepared by dissolving 12.8 grams of o-(2-chloroallyl) phenol in a solution containing 6 grams of potassium hydroxide in 50 milliliters of water and then adding thereto 7.9 grams of epichlorohydrin. The resulting mixture was stirred overnight and the reaction product was extracted with ether, dried over magnesium sulfate and evaporated. Upon distillation at a temperature of 108° C. to 110° C. and at a pressure of 0.25 millimeter of mercury, 7.0 grams of product were obtained.

Example 4

1-(o-cis-3-chloroallyl)-2,3-epoxypropane was prepared by adding 12.5 grams of o-(cis-3-chloroallyl) phenol and 7.6 grams of epichlorohydrin to a solution of 5.8 grams of potassium hydroxide in 50 milliliters of water. The mixture was stirred overnight. The resulting product was extracted with ether, dried over magnesium sulfate and evaporated. Upon distillation, at a temperature of 120° C. to 125° C., and at a pressure of 0.3 millimeter of mercury, 9.0 grams of product were obtained.

Examples 5 through 10 illustrate the preparation of the active compounds of this invention.

Example 5.—1-(o-allylphenoxy)-2-hydroxy-3-isopropylaminopropane

An admixture of 698 grams (3.67 mols) of o-allyl-epoxypropoxybenzene and 3,000 milliliters of isopropanol and 266 grams (4.5 mols) of isopropylamine was prepared in a 5 liter flask equipped with an efficient condenser. The solution was refluxed for 4 hours, after which the isopropylamine and the alcohol were distilled off. The resulting product o-[3-isopropylamino-2-hydroxypropoxy]-allylbenzene was recrystallized from petrol ether (boiling range 40–60° C.). The yield was 643 grams of a product having a melting point of 58° C. The product was then dissolved in ether, an ethereal solution of hydrogen chloride added thereto and the hydrochloride salt precipitated. The resulting product was dissolved in a methanol-ethylacetate mixture and precipitated by the addition of ether. The yield was 624 grams of material having a melting point of 107° C.

Example 6.—1-(o-allylphenoxy)-2-hydroxy-3-isopropylaminopropane

A solution of 24.6 grams of o-allyl-epoxypropoxy-benzene dissolved in 250 milliliters of absolute ethanol saturated with ammonia was placed in an autoclave and heated on a steambath for 2 hours. The alcohol was then removed by distillation and the residue was redissolved in a mixture of methanol and ethylacetate. Hydrogen chloride gas was introduced into the solution. The hydrochloride salt was then precipitated by the addition of ether to yield 11.4 grams of product. Five grams of the amine-hydrochloride thus formed were dissolved in 50 milliliters of methanol and 9 milliliters of acetone. The resulting solution was cooled to about 0° C. At this temperature 5 grams of sodium borohydride were added over a period of 1 hour. Another 2.2 milliliters of acetone and 0.8 gram of sodium borohydride were added and the solution was kept at room temperature for 1 hour, after which 150 milliliters of water were added to the solution. The solution was then extracted with three 100-milliter portions of ether which were combined, dried over potassium carbonate, and evaporated. The free base was then recrystallized from petrol ether (boiling range 40–60° C.) to yield 2.7 grams of material having a melting point of 57° C.

Example 7.—1-(o-propenylphenoxy)-2-hydroxy-3-isopropylaminopropane hydrochloride A mixture of 7.1 grams of o-propenyl-epoxypropoxybenzene, 3 grams of isopropylamine and 60 milliliters of isopropanol were refluxed for 3 hours. The solvent was then distilled off and the crystalline residue which had a melting point of 83° C. was dissolved in a methanol-ethylacetate mixture to which hydrogen chloride was introduced. The hydrochloride salt was then precipitated by the addition of ether to the solution. Recrystallization of the resulting product from acetone gave 6.5 grams of material having a melting point of 131° C.

Example 8.—1-(o-propenylphenoxy)-2-hydroxy-3-isopropylaminopropane hydrochloride Ten grams of o-propenyl-epoxypropoxybenzene was dissolved in 10 milliliters of absolute ethanol and the solution was saturated with ammonia. The resulting reaction mixture was placed in an autoclave and heated on a water-bath for 2 hours. The alcohol was then removed and the residue dissolved in methanol-ethylacetate. Hydrogen chloride was introduced into the solution, after which the hydrochloride salt was precipitated by the addition of ether. The yield was 6.7 grams of the hydrochloride salt having a melting point of 166° C. The amine base was liberated from the hydrochloride and was dissolved in 35 milliliters of methanol and 5.5 milliliters of acetone to which 0.5 gram of sodium borohydride was then added and the solution stirred at room temperature for 1 hour. One hundred milliliters of water were added to the solution and then the solution was extracted with ether (three 100-milliliter portions), dried over potassium carbonate and evaporated. The resulting residue was dissolved in methanol-ethylacetate and hydrogen chloride was introduced. The hydrochloride salt was then precipitated by the addition of ether. Recrystallization from acetone gave 1.4 grams of the hydrochloride salt having a melting point of 130° C.

Example 9.—1-(o-2-chloroallyphenoxy)-2-hydroxy-3-isopropylaminopropane hydrochloride Four grams of o-(2-chloroallyl)-epoxypropoxybenzene were dissolved in 30 milliliters of isopropanol and 2.5 grams of isopropylamine were added thereto. The resulting solution was refluxed for 4 hours, whereupon the alcohol and unreacted amine were distilled off. The residue was dissolved in methanol-ethylacetate and hydrogen chloride was introduced into the solution. The hydrochloride salt was then precipitated by the addition of ether. After recrystallization from acetone, 1 gram of the hydrochloride salt having a melting point of 105° C. was obtained.

Example 10.—1-(o-cis-3-chloroallylphenoxy)-2-hydroxy-3-isopropylaminopropane hydrochloride A mixture of 7.2 grams of o-(cis-3-chloroallyl)-epoxypropoxybenzene, 4.5 grams of isopropylamine and 75 milliliters of isopropanol were refluxed for 4 hours. The solvent was distilled off and the residue dissolved in ether. The hydrochloride salt was then precipitated by the addition of a solution of hydrogen chloride in ether. On recrystallization from a mixture of methanol-ethylacetate and reprecipitating with ether, 6.7 grams of a product having a melting point of 100° C. was obtained.

Example 11.—Resolution of 1-(o-allylphenoxy)-2-hydroxy-3-isopropylaminopropane In 10 milliliters of methanol there was dissolved 2.48 grams of 1 - (o - allylphenoxy) - 2 - hydroxy - 3 - isopropylaminopropane and 1.5 grams D tartaric acid and a mixture of ethylacetate-ether was added to the resulting solution. After several days the precipitated crystals obtained were recrystallized from methanol-ethylacetate until the optical rotation was constant. The product was found to have a melting point of 90° C.

$[\alpha]_D^{20} = 8.2°$ (C=1, H$_2$O)
$[\alpha]_{313}^{20} = 76.5°$ (C=1, H$_2$O)

Examples 12–15 illustrate the preparation of pharmaceutical formulations containing the active ingredients of this invention.

Example 12

A syrup containing 2% (weight per volume) of the active substance was produced from the following ingredients:

| | |
|---|---|
| 1-(o-allylphenoxy) - 2 - hydroxy - 3 - isopropylaminopropane HCl _____ g__ | 2.0 |
| Saccharin _____ g__ | 0.6 |
| Sugar _____ g__ | 30.0 |
| Glycerol _____ g__ | 5.0 |
| Flavoring agent _____ g__ | 0.1 |
| Ethanol 96% _____ ml__ | 10.0 |
| Distilled water to _____ ml__ | 100.0 |

The sugar, saccharin and the ether salt were dissolved in 60 grams of hot water. After cooling, the glycerol was added and a solution of the flavoring agent in ethanol was added. The mixture was then made up to a volume of 100 milliliters with water.

The active substances shown above may be replaced by other pharmaceutically acceptable acid addition salts.

Example 13

Two hundred and fifty grams of 1-(o-allylphenoxy)-2 - hydroxy - 3 - isopropylaminopropane hydrochloride were mixed with 175.8 grams of lactose, 169.7 grams of potato starch and 32 grams of colloidal silica. The mixture was moistened with a 10% gelatin solution and granulated through a 12 mesh sieve. After drying, 160 grams of potato starch, 50 grams of talc, 2.5 grams of magnesium stearate were mixed in and the resulting mixture was pressed into tablets (10,000) containing 25 milligrams of active substances which were suitable for use as tablets. The tablets were marked with break lines to enable a dose other than 25 milligrams or multiples thereof to be administered.

Example 14

A granulate was prepared from 250 grams of 1-(o-propenylphenoxy) - 2 - hydroxy - 3 - isopropylaminopropane hydrochloride, 175.9 grams of lactose and an alcoholic solution of 25 grams of polyvinylpyrrolidone. After drying, the granulate was mixed with 25 grams of talc, 40 grams of potato starch and 2.50 grams of magnesium stearate and pressed into 10,000 biconvex tablets. These tablets were first coated with a 10% alcoholic shellac solution then with a water solution containing 45% of saccharose, 5% gum acacia, 4% of gelatin and 0.2% of dyestuff. Talc and sugar powder were used as dusting powders after the first 15 appliactions. The coating was then finished with a 66% sugar syrup and polished with a 10% carnauba wax solution in carbon tetrachloride.

Example 15

One gram of 1 - (o - allyphenoxy) - 2 - hydroxy - 3-isopropylaminopropane hydrochloride, 0.8 gram of sodium chloride and 0.1 gram of ascorbic acid were dissolved in sufficient distilled water to make 100 milliliters of solution. This solution, each milliliter of which contained 10 milligrams of the active substance, was used to fill ampules which were sterilized by heating for 20 minutes at 120° C.

The alkenylphenoxy - propoxy - isopropanolamines described herein, including the optical isomers and racemic mixtures thereof, have been shown to possess valuable pharmacological properties. In low doses they block the effect of intravenously administered isoprenaline as well as the effects of sympathetic stimulation on the heart.

The results of some pharmacological tests conducted on mice and cats are given in Table I.

In determining the approximate toxicity in mice, male mice weighing 25–30 grams were used and the injections were carried out at the rate of 0.1 ml. per 10 seconds. The animals were observed for 72 hours. Comparisons made with propranolol and pronethalol are shown in the table.

In this study on a hexamethonium-treated cat, the cat was anesthetized with nembutal sodium (30 mg. per kilog. of body weight) intraperitoneously. Intra-arterial mean blood pressure, heart rate, and contractile heart force (the latter with a straingauge arch attached to the right ventricle) were registered. Both vagus nerves were divided at the neck. Artificial respiration was given. Hexamethonium chloride was given intravenously at a dose of 4 mg. per kilog. of body weight, at an interval of 25 minutes; preparatory tests showed that this dose blocked preganglionic sympathetic stimulation of the heart without affecting the effect of postganglionic stimulation. After the first dose of hexamethonium chloride a mixture of 5% Macrodex® and 1% Rheomacrodex® was administered (at about 5 mg. per kilog. of body weight) to compensate for the hypotensive effect of the hexamethonium chloride.

Following the preparation of the cat as described above, an intravenous isoprenaline dose, which gave a pronounced but submaximal positive, chronotropic and inotropic heart effect was administered. Then, at intervals of 25 minutes, intravenous injections of the test compound were given in increased doses for 2 minutes. Ten minutes thereafter isoprenaline at the same dose as had been tested initially was given. For comparison propranolol and pronethalol were also tested.

and the clinical biochemical tests were unchanged. Five patients with minor cardiovascular disorders were studied after a single oral dose of 40 mg. of the test compound. In all subjects a rapidly occurring increase in water excretion was found, but no consistent hemodynamic changes were observed. The observed electrolyte excretion, the mechanism of which is not yet understood, may be of therapeutic value. In five patients with various types or arrhythmia, 1-(o-allylphenoxy)-2-hydroxy - 3 - isopropylaminopropane hydrochloride was given orally (10-40 mg. daily in divided doses) with subjective good results. No side-effects were observed.

These clinical tests indicate that in accordance with the pharmacological tests the compounds may be clinically used, in particular for the treatment of cardiac disorders in vascular diseases when the heart has to be protected against excessive sympathetic stimulation, e.g., during mental stress or muscular work, which are known to increase blood levels of the sympathomimetic amines, epinephrine and norepinephrine.

Examples 16–19 describe further clinical tests on the compounds of the invention.

Example 16

In two experiments on a male test subject, the effects of orally administered 1-(o-allylphenoxy)-2-hydroxy-3-isopropylaminopropane hydrochloride were studied. In one of the experiments the influence of the compound on the effects of isoprenaline and epinephrine on blood

TABLE I

| Compound | Hexamethonium-treated cat | | | White mice—intraperitoneal toxicity ($LD_{50}$) in mg./kg body-weight |
|---|---|---|---|---|
| | Cardiac block of isoprenaline relative potency | "Unspecific" heart depression relative potency | Intrinsic heart stimulation | |
| Propranolol | 1 | 1 | 0 | 120 |
| Pronethalol | 0.1–0.2 | 1–2 | Weak | 110 |
| Formula (1) wherein R is: | | | | |
| Allyl, racemate | 1 | 2 | Very weak | 90 |
| Allyl, levo | 2 | 2 | Weak | 110 |
| Allyl, dextro | 0.03 | 2 | 0 | 90 |
| 2-chloroallyl | 1 | 2 | Very weak | 110 |
| 3-chloroallyl | 0.2 | 2 | Weak | 100 |
| Propenyl | 1 | 2 | do | 100 |

An evaluation of the clinical effects of the compound 1-(o-allylphenoxy) - 2 - hydroxy - 3 - isopropylaminopropane hydrochloride was made. The drug was administered orally to 21 patients in single or in several daily doses for a period of up to 10 consecutive days. It was thereby observed that the compound only slightly changed the hemodynamic values at rest. During exercise the cardiac output was unaltered and the stroke volume of the heart increased. The blood pressure was lowered and the heart rate was markedly lowered.

In patients with arrhythmia (mostly extra systoles) or minor cardiovascular disorders, the test compound was administered for 10 consecutive days in four daily oral doses of 40 mg. Before, during and after the medication frequent recordings of blood pressure, heart rate and electrocardiograms were made. Furthermore, a detailed study of possible effects on liver and kidney functions and of the blood picture was performed by means of routine clinical chemical tests performed almost daily. In some patients with arrhythmia who had previously been treated with quinidine or propanolol without success, the test compound was likewise ineffective. However, it was found to produce no adverse effects on the physiological and chemical tests carried out on any patient. In two patients a total dose of 360 mg. of the test compound was administered in three equal doses during one day. No unfavorable symptoms were reported pressure and heart rate was studied; in the other, the effects on blood pressure and heart rate at rest and during work on an ergometric bicycle were registered auscultatorally on the upper part of the arm.

In the first experiment, the subpect, who had fasted for 15 hours prior to the experiment, was placed in a supine position. First, the effects of intravenous infusion of isoprenaline (0.04 µg. of l-isoprenaline sulfate per kilog. of body weight per minute for 5 minutes) and then the effects of epinephrine (0.2 µg. of l-epinephrine hydrochloride per kilog. of body weight per minute for 5 minutes) were registered. Then the test compound was administered orally at a dose of 0.5 mg. per kilog. of body weight (total dose 40 mg.) dissolved in 100 milliliters of water. Thirty and eighty minutes thereafter isoprenaline was again administered and 55 minutes after administration of the test compound epinephrine was again administered.

The 1-(o-allylphenoxy)-2-hydroxy-3 - isopropylaminopropane hydrochloride produced no subjective symptoms and did not significantly change the basal blood pressure and heart rate. The effect of the isoprenaline on heart rate and blood pressure was significantly weakened by the prior administration of the test compound, both 30 and 80 minutes after treatment with isoprenaline. The epinephrine produced a pure pressor effect and bradycardia whereas the systolic blood pressure increased to a lesser degree than was found prior to the administration of the test compound.

These results indicate that the dominating function of the test compound in man was that of a cardiovascular $\beta$-receptor blockage. The substance blocked the $\beta$-receptor activation of epinephrine, but not the activation of vascular $\alpha$-receptors.

In another experiment, the test subject was placed on a bicycle ergometer. After stable registrations of rest values for blood pressure and heart rate had been obtained, the test subject took work loads of 600–900–1200 k.p.m./min. The duration of each work load was six minutes. Stable values for blood pressure and heart rate were observed during the last two minutes of each work load period.

The same work load series were repeated one hour after oral administration of 0.75 mg. per kilog. of body weight of 1 - (o-allylphenoxy)-2-hydroxy-3-isopropylaminopropane hydrochloride dissolved in water (total dose 60 mg.). Two and a half hours and again four hours after administration, studies were made while the person was at rest and during a work load of 600 k.p.m./min.

The rest values for heart rate and blood pressure did not change after administration of the test compound; however, the heart rate, during work, was considerably lower. The effect of the test compound was most pronounced one hour after the administration and it had ceased after four hours. The test compound also had a tendency to reduce the systolic blood pressure during work. It produced no subjective symptoms at rest or during work.

These results indicate that the test compound reduced the sympathetic tone of the heart during work without significantly inhibiting the physical ability to perform work.

Example 17

The effects of orally administered 1-(o-allylphenoxy)-2 - hydroxy-3-isopropylaminopropane hydrochloride and propranolol were studied in one male subject. The investigation was carried out on a subject in a recumbent position after he had fasted for 15 hours before the experiment. The systolic and diastolic blood pressures were recorded by auscultation with a cuff on the upper arm and the heart rate was observed from an electrocardiogram recording.

Firstly, the effect of an intravenous infusion of isoprenaline (0.04 $\mu$g. of 1-isoprenaline sulfate per kilog. of body weight per minute) and of epinephrine (0.2 $\mu$g. of 1-epinephrine chloride per kilog. of body weight per minute) given during the first five minutes of the experiment were recorded. Then the test compounds (0.5 mg./kg. dissolved in 100 ml. of water) were given. The isoprenaline infusion and the epinephrine infusion were repeated at 30 and 80 minutes, and at 55 and 60 minutes, respectively, after the administration of the test compound.

Neither the propranolol nor the 1-(o-allylphenoxy)-2-hydroxy - 3 - isopropylaminopropane hydrochloride produced any subjective symptoms. No changes in basal heart rate and blood pressure were observed after the administration of 1 - (o-allylphenoxy)-2-hydroxy-3-isopropylaminopropane hydrochloride, but the effect of isoprenaline on the heart rate and blood pressure was reduced when administered both 30 and 80 minutes after the administration of the 1 - (o-allylphenoxy)-2-hydroxy-3-isopropylaminopropane hydrochloride. The epinephrine response was converted to a pure pressor effect accompanied by bradycardia.

Example 18

In four subjects a double blind study of orally administered 1 - (o-allylphenoxy)-2-hydroxy-3-isopropylaminopropane hydrochloride and a placebo was performed. Two experiments were made on each subject. In one of the experiments two tablets containing 20 mg. of the test compound were administered; in the other, two identical placebo tablets were employed. The subjects, who had eaten a light metal 1.5–12 hours before the start of the experiment, were in supine position with an indwelling plastic needle in an antecubital vein. Systolic and diastolic blood pressures were recorded by conventional auscultatory technique. Heart rate was continuously recorded by electrocardiogram.

After a period of rest of about 30 minutes, the experiments were started by recording the blood pressures at 2 to 5 minute intervals for 20 minutes. Then 1-isoprenaline was administered intravenously for 5 minutes from a motor-driven syringe (0.02 $\mu$g. of 1-isoprenaline sulfate per kilog. of body weight per minute dissolved in physiological saline solution containing 0.1% of ascorbic acid, at a rate of 1 milliliter per minute). Blood pressure and heart rate were recorded every minute during infusion and up to 5 minutes after the end of the infusion, and thereafter every 5 minutes. Twenty-five minutes after the end of the isoprenaline infusion 2 tablets of the test compound or 2 placebos were given orally together with 100 milliliters of water. Forty-five minutes later isoprenaline was administered as initially, and this was repeated every 45 minutes, the last infusion being given 3 hours after the administration of the tablets.

In this study the rest values for blood pressure and heart rate, before administration of the test compound, were, in all four subjects, somewhat higher in the first experiment than in the second. This difference could be due to the nervous tension induced by lack of experience of the test.

The heart rate at rest showed a tendency to decrease after administration of the test compound but the same effect was observed in the placebo experiments. The results indicate that the test compound did not significantly change the rest values for the blood pressure and the heart rate.

Three subjects had normal electrocardiogram complexes both before and after administration of the drug. One subject had a history of frequent extrasystoles in stress periods. He had frequent, single, monofocal ventricular extrasystoles through the whole first experiment both before and after administration of the test compound. During the first isoprenaline infusion they disappeared almost completely but reappeared immedaitely afterwards. After the administration of the test compound their frequency was definitely lower.

The intravenous infusion of isoprenaline increased the systolic blood pressure, decreased the diastolic blood pressure and augmented the heart rate. During the infusion of isoprenaline all subjects had an unpleasant palpitation and throbbing headache synchronous with the pulse, with maximum discomfort during the last minutes of the infusion. After the administration of the test compound the effects of isoprenaline on blood pressure and heart rate were markedly decreased. The subjective sensations created by isoprenaline were almost or completely abolished by the test compound. When placebos were given the objective and subjective responses to the repeated isoprenaline infusion did not change significantly during the entire study. No undesirable side-effects were observed. Two subjects reported imperative miction needs one hour after the administration of the test compound, and the other two voided a large volume of urine immediately after the test compound was given. No such effect was observed in the tests in which placebos were employed.

Example 19

The local anesthetic effect of 1% solution of 1-(o-allylphenoxy) - 2 - hydroxy-3-isopropylaminopropane hydrochloride in the form of the racemic mixture and the isomers were investigated in two healthy volunteers. Lidocaine[1] hydrochloride of the same concentration was included in this test as a basis of comparison. The four solutions were administered from coded bottles by injecting 0.1 milliliter intradermally on the volar side of the forearm. The code was broken only after the study had been completed.

The duration of the local anesthesia was not and the maximum anesthetic area was measured for each intradermal wheal. The local anesthesia was studied by pricking the skin with a sharp needle. The mean value results are given in Table II below.

TABLE II

| Compound | Maximum area of anest., mm. | Duration of local anest. min. |
|---|---|---|
| 1-(o-allylphenoxy)-2-hydroxy-3-isopropylaminopropane hydrochloride, racemate | 14 x 14 | 63 |
| 1-(o-allylphenoxy)-2-hydroxy-3-isopropylaminopropane hydrocloride, dextro | 12.5 x 12.5 | 63 |
| 1-(o-allylphenoxy)-2-hydroxy-3-isopropylaminopropane hydrocloride, levo | 7 x 7 | 30 |
| Lidocaine[1], hydrochloride | 7 x 7 | 63 |

[1] α-Diethylamino-aceto-2, 6-xylidide.

The results show that the racemic mixture and the isomers of 1 - (o-allylphenoxy) - 2 - hydroxy-3-isopropylaminopropane hydrochloride have local anesthetic properties in man which are equal to or better than Lidocaine[1].

We claim:
1. Compounds having the formula

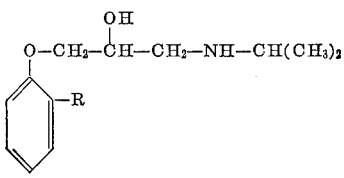

wherein R is a radical selected from the group consisting of allyl, propenyl, 2-chloroallyl, and 3-chloroallyl, and pharmaceutically acceptable acid addition salts thereof.

2. The levo isomer of the compounds defined in claim 1.

3. The compound 1-(o-allylphenoxy)-2-hydroxy-3-isopropylaminopropane and pharmaceutically acceptable acid addition salts thereof.

4. The levo isomer of the compound defined in claim 3.

References Cited

UNITED STATES PATENTS 3,337,628   8/1967   Crowther et al. ____ 260—570.7

ROBERT V. HINES, Primary Examiner

U.S. Cl. X.R.

260—348, 501.19, 566, 570.7, 612; 424—330

UNITED STATES PATENT OFFICE
CERTIFICATE OF CORRECTION

Patent No. 3,466,325                      September 9, 1969

Arne Elof Brandstrom et al.

It is certified that error appears in the above identified patent and that said Letters Patent are hereby corrected as shown below:

Column 3, line 4, "Product" should read -- produce --. Column 6, line 36, "substances" should read -- substance --; line 53, "appliactions" should read -- applications --; line 73, after "Table I" insert -- below --. Column 8, line 54, "subpect" should read -- subject --. Column 10, line 2, "metal" should read -- meal --; line 44, "immedaitely" should read -- immediately --. Column 11, line 3, "not" should read -- noted --; lines 18 and 20, "hydrocloride" should read -- hydrochloride --.

Signed and sealed this 22nd day of September 1970.

(SEAL)
Attest:

EDWARD M. FLETCHER, JR.
Attesting Officer

WILLIAM E. SCHUYLER, JR.
Commissioner of Patents